(12) United States Patent
Zekavica et al.

(10) Patent No.: US 9,045,068 B2
(45) Date of Patent: Jun. 2, 2015

(54) ONE-PIECE SEAT BACK STRUCTURE

(75) Inventors: Ornela Zekavica, Novi, MI (US);
Phillip W. Wilson, Wixom, MI (US);
Anthony M. Kestian, Highland, MI
(US); Elizabeth A. Allen, Ypsilanti, MI
(US); Mark S. Williamson, Canton, MI
(US); Joseph F. Prosniewski,
Brownstown Twp., MI (US); **Catherine
M. Amodeo**, Livonia, MI (US);
Miodrag Mitch Petrovich, Ann Arbor,
MI (US); Ronald G. Bedro, Plymouth,
MI (US); Edward J. Lamont, Livonia,
MI (US); Michael J. Leighton, LaSalle
(CA); William Shawn Brewer,
Plymouth, MI (US); David J. Hayes,
West Bloomfield, MI (US); **Robert J.
Hicks, Canton, MI (US); Andrew J.
Erard, Ceresco, MI (US); Michael G.
Buss, Kalamazoo, MI (US); Mark A.
Harris**, West Bloomfield, MI (US);
Alexander I. Balin, Ann Arbor, MI
(US); Alex Saveski, South Lyon, MI
(US); Eric B. Michalak, Northville, MI
(US); Kurt A. Seiboid, Whitemore Lake,
MI (US); Daniel J. Sakkinen, Highland,
MI (US); Nicholas L. Petouhoff, South
Lyon, MI (US)

(73) Assignee: **Johnson Controls Technology
Company**, Holland, MI (US)

( * ) Notice: Subject to any disclaimer, the term of this
patent is extended or adjusted under 35
U.S.C. 154(b) by 291 days.

(21) Appl. No.: 13/579,851

(22) PCT Filed: Feb. 18, 2011

(86) PCT No.: PCT/US2011/025531
§ 371 (c)(1),
(2), (4) Date: Mar. 11, 2013

(87) PCT Pub. No.: WO2011/103501
PCT Pub. Date: Aug. 25, 2011

(65) Prior Publication Data
US 2013/0161992 A1    Jun. 27, 2013

Related U.S. Application Data

(60) Provisional application No. 61/306,277, filed on Feb. 19, 2010.

(51) Int. Cl.
*A47C 7/02* (2006.01)
(Continued)

(52) U.S. Cl.
CPC .. *B60N 2/68* (2013.01); *B60N 2/44* (2013.01);
*B60N 2/20* (2013.01); *B60N 2/22* (2013.01);
*B60N 2/682* (2013.01); *B60N 2002/684*
(2013.01)

(58) Field of Classification Search
USPC ................. 297/354.1, 452.1, 452.34, 452.36,
297/452.18, 452.29, 452.33, 452.21, 452.23
See application file for complete search history.

(56) References Cited

U.S. PATENT DOCUMENTS 4,544,204 A    10/1985    Schmale
(Continued)

FOREIGN PATENT DOCUMENTS

CN    2623506    7/2004
CN    1706687    12/2005
(Continued)

OTHER PUBLICATIONS

Machine Translation of DE 202005007198, 10 pages.*
(Continued)

*Primary Examiner* — Kristina Junge
(74) *Attorney, Agent, or Firm* — Fletcher Yoder, P.C.

(57) ABSTRACT

A seat back structure includes a web extending about a central opening, and an inner flange extending about an inner perimeter of the web adjacent to the central opening. The seat back structure also includes an outer flange extending about an outer perimeter of the web. The inner flange, the outer flange and the web form a channel extending about the seat back structure, and the seat back structure is formed from a single piece of material.

19 Claims, 8 Drawing Sheets

(51) Int. Cl.
  *B60N 2/68* (2006.01)
  *B60N 2/44* (2006.01)
  *B60N 2/20* (2006.01)
  *B60N 2/22* (2006.01)

(56) References Cited

U.S. PATENT DOCUMENTS

| | | | |
|---|---|---|---|
| 5,499,863 A * | 3/1996 | Nakane et al. | 297/452.2 |
| 6,048,033 A * | 4/2000 | Sakurai et al. | 297/452.18 |
| 6,267,443 B1 | 7/2001 | Kurita et al. | |
| 6,378,946 B1 * | 4/2002 | Cope et al. | 297/452.2 |
| 6,390,556 B1 | 5/2002 | Moradell | |
| 6,398,300 B1 * | 6/2002 | Young | 297/216.13 |
| 6,607,247 B2 * | 8/2003 | Becker et al. | 297/452.18 |
| 6,767,067 B2 | 7/2004 | Fourrey et al. | |
| 2001/0006302 A1 * | 7/2001 | Nagayasu et al. | 297/440.15 |

FOREIGN PATENT DOCUMENTS

| | | |
|---|---|---|
| CN | 1236940 C | 1/2006 |
| DE | 202005007198 | 9/2005 |
| EP | 1950086 | 7/2008 |
| GB | 2218771 | 11/1989 |
| JP | 06-205716 | 7/1994 |
| JP | 09-252873 | 9/1997 |
| JP | 2000-270961 | 10/2000 |
| JP | 2001-037572 | 2/2001 |
| JP | 2001-340161 | 12/2001 |
| WO | 9815422 | 4/1998 |
| WO | 9910196 | 3/1999 |
| WO | 2010101874 | 9/2010 |

OTHER PUBLICATIONS

PCT International Search Report and Written Opinion mailed May 8, 2011.
Chinese Office Action dated Jun. 16, 2014.
Japanese Office Action issued Jul. 31, 2014 and delivered on Aug. 5, 2014.
Korean Office Action dated Sep. 27, 2013.
Japanese Office Action issued Dec. 16, 2013 and delivered Jan. 7, 2014.
Chinese Office Action Mailed Jan. 12, 2015.

* cited by examiner

ONE-PIECE SEAT BACK STRUCTURE

CROSS REFERENCE TO RELATED APPLICATION

This application claims priority from and the benefit of U.S. Provisional Application Ser. No. 61/306,277, entitled "ONE PIECE SEAT STRUCTURE", filed Feb. 19, 2010, which is hereby incorporated by reference in its entirety.

BACKGROUND

The invention relates generally to vehicle seating, and more particularly, to a one-piece seat back structure.

Vehicle seating typically includes a seat bottom and a seat back to support a driver or passenger. In certain seating configurations, both the seat bottom and seat back include a structural assembly having a rigid structure, cushions, and a fabric covering. Each structural assembly may also include various ancillary structures, such as a recliner mechanism and a headrest support, for example. The structural assemblies are configured to support the weight of the passenger during normal vehicle operation, and to manage loads transferred to the seat during an impact.

Certain seat back structures are constructed from metal formed components. For example, a seat back structure may include a left side member, a right side member, a top cross member, and a bottom cross member, each constructed via a metal forming process. The members may be coupled to one another, e.g., via bolted or welded connections, to form the complete seat back structure. Unfortunately, because each member is a different shape, a number of dies and presses are employed to form each member, thereby increasing production costs. Furthermore, the process of coupling the members to one another (e.g., by bolting, welding, etc.) may further increase costs associated with manufacturing the seat back structure due to the required fixturing and joint making processes.

BRIEF DESCRIPTION OF THE INVENTION

The present invention relates to a seat back structure including a web extending about a central opening, and an inner flange extending about an inner perimeter of the web adjacent to the central opening. The seat back structure also includes an outer flange extending about an outer perimeter of the web. The inner flange, the outer flange and the web form a channel extending about the seat back structure, and the seat back structure is formed from a single piece of material.

The present invention also relates to a seat back structure including a web having a left side member, a right side member, a top cross member and a bottom cross member. The seat back structure also includes an inner flange extending along an inner side of the left side member, the right side member, the top cross member and the bottom cross member. The seat back structure further includes an outer flange extending along an outer side of the left side member, the right side member, the top cross member and the bottom cross member. The inner flange, the outer flange and the web form a channel extending about the seat back structure, and the seat back structure is formed from a single piece of material.

The present invention further relates to a method of manufacturing a seat back structure including forming the seat back structure from a single piece of material. The seat back structure includes a web extending about a central opening, an inner flange extending about an inner perimeter of the web adjacent to the central opening, and an outer flange extending about an outer perimeter of the web. The inner flange, the outer flange and the web form a channel extending about the seat back structure.

DETAILED DESCRIPTION

Figure 1:
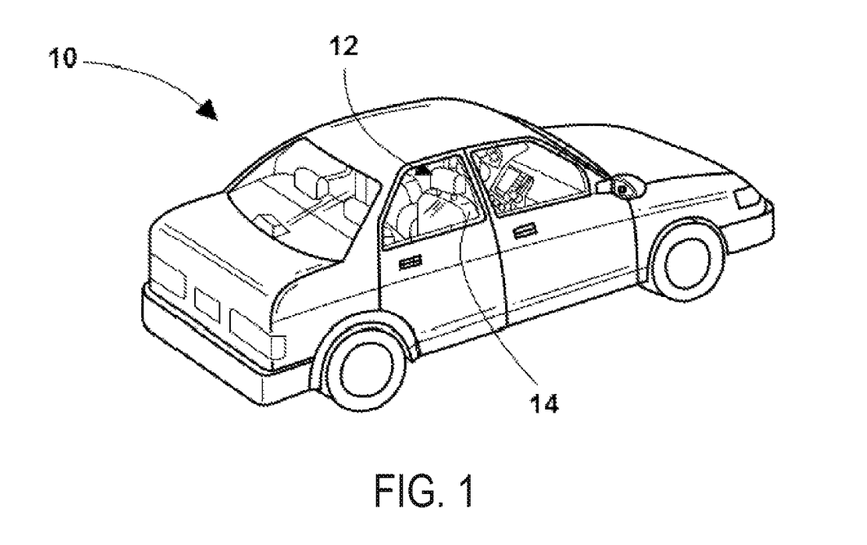
FIG. 1 is a perspective view of an exemplary vehicle that includes seats which may employ a one-piece seat back structure.

FIG. 1 is a perspective view of an exemplary vehicle that includes seats which may employ a one-piece seat back structure. As illustrated, the vehicle 10 includes an interior 12 having a seat 14. As discussed in detail below, the seat 14 includes a seat back structure formed from a single piece of material. Such a configuration may substantially reduce seat construction costs compared to seat backs that include multiple components joined together to form a complete structure. Specifically, seat backs having multiple formed components of different shapes (e.g., brackets, cross-members, etc.) require separate dies, or separate series of dies, to form each component. As will be appreciated, construction cost may increase proportionally to the number of dies due to the expense associated with designing and building each die. In contrast, the present embodiment employs a single die, or single series of dies, to form the seat back structure from one piece of material (e.g., sheet metal). Furthermore, because the entire seat back structure is formed as a single unit, labor and material costs associated with joining the individual components may be substantially reduced or eliminated. In addition, the resultant seat back structure may be lighter than multi-component structures because of the reduction in number of connections (i.e., fewer weld joints, fewer bolted connections, etc.). Consequently, the one-piece seat back structure may be both lighter and less expensive to produce than conventional structures formed by coupling multiple components.

Figure 2:
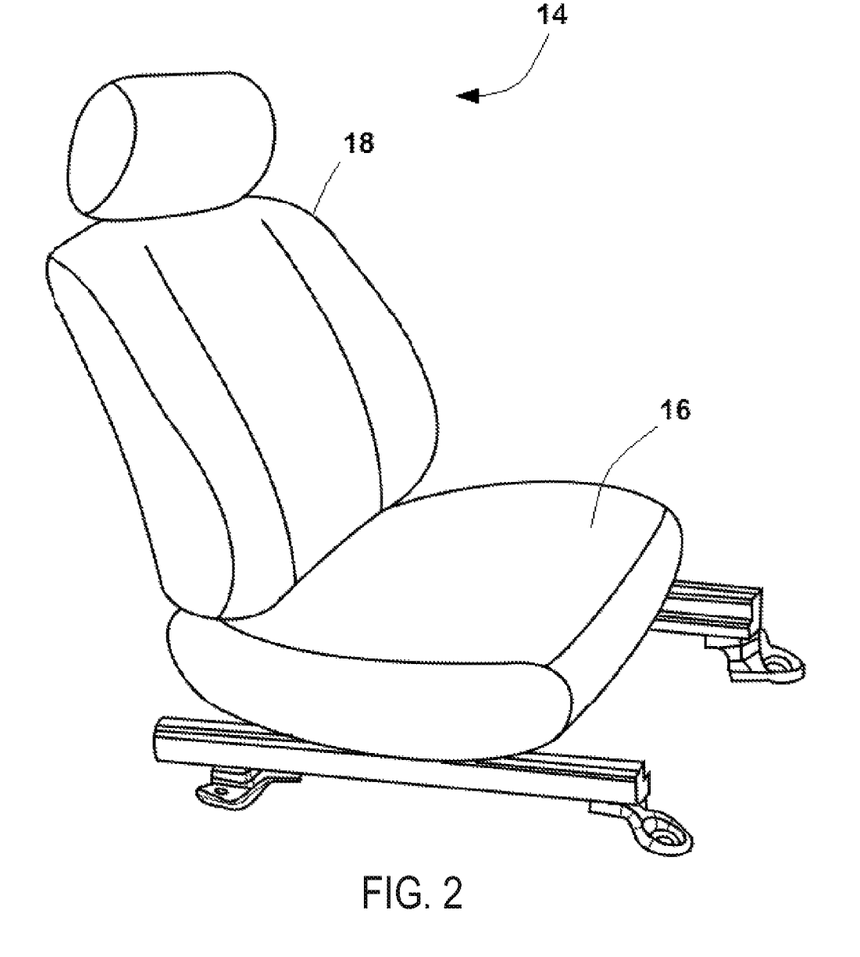
FIG. 2 is a perspective view of the seat shown in FIG. 1.

FIG. 2 is a perspective view of the seat 14 shown in FIG. 1. As illustrated, the seat 14 includes a seat bottom 16 and a seat back 18. In the present embodiment, the seat bottom 16 and the seat back 18 include a rigid structure, one or more cushions, and a fabric covering. The rigid structures serve to support the weight of a passenger during normal vehicle operation and during a vehicular impact (e.g., rapid acceleration or deceleration, etc.). Furthermore, the seat bottom structure secures the seat bottom 16 to a floor of the vehicle 10, and provides a mounting surface for the seat back 18. As discussed in detail below, the seat back structure may be formed from a single piece of material, thereby reducing construction costs compared to structures formed from multiple components.

Figure 3:
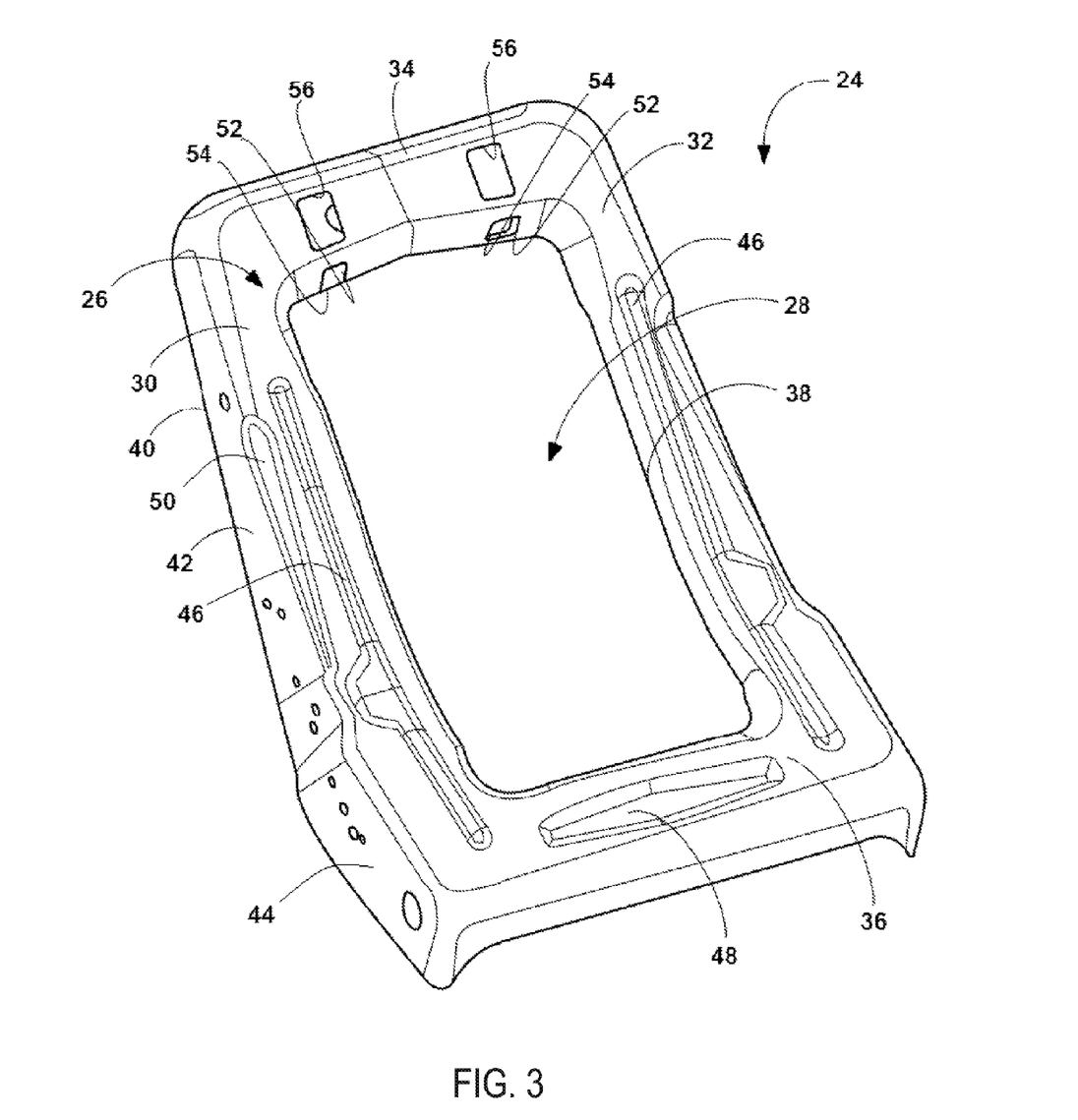
FIG. 3 is a back perspective view of an embodiment of a one-piece seat back structure that may be employed within the seat of FIG. 2.

FIG. 3 is a back perspective view of an embodiment of a one-piece seat back structure 24 that may be employed within the seat 14 of FIG. 2. As illustrated, the seat back structure 24 includes a web, such as the illustrated shaped web 26, extending about a central opening 28. In the illustrated embodiment, the web 26 includes a left side member 30, a right side member 32, a top cross member 34, and a bottom cross member 36, forming a substantially rectangular structure. The seat back structure 24 also includes an inner flange 38 extending about an inner perimeter of the web 26 adjacent to the central opening 28. Specifically, the inner flange extends along an inner side of the left side member 30, the right side member 32, the top cross member 34 and the bottom cross member 36. In addition, the seat back structure 24 includes an outer flange 40 extending about an outer perimeter of the web 26 along an outer side of the left side member 30, the right side member 32, the top cross member 34 and the bottom cross member 36. As discussed in detail below, the inner flange 38, the outer flange 40 and the web 26 form a channel extending about the seat back structure 24. The channel enhances the strength of the seat back structure 24, thereby providing a lighter and/or stronger structure than structures having an inner flange or an outer flange that only extends about a portion of the web. The channel also provides a suitable area for mounting a cushion to the seat back structure.

In the illustrated embodiment, the outer flange 40 extending from the left and right side members 30 and 32 includes a first region 42 and a second region 44. The second region 44 is oriented approximately perpendicular to the web 26, thereby providing a surface configured to facilitate precise mounting of ancillary structures. For example, a recliner mechanism may be mounted to the second region 44 adjacent to the bottom cross member 36. As discussed in detail below, the recliner mechanism may be coupled to the second region 44 of the outer flange 40 via a variety of mounting arrangements, thereby enabling the seat back structure 24 to recline relative to the seat bottom chassis. In contrast, the first region 42, which is positioned above the second region 44, is angled more than 90 degrees laterally outward from the web.

The seat back structure 24 also includes a variety of beads configured to enhance the structural rigidity of the structure without increasing the weight. As illustrated, the left side member 30 and the right side member 32 of the web 26 include a substantially vertical bead 46. While each side member includes a single bead in the illustrated embodiment, it should be appreciated that alternative embodiments may include more or fewer beads. For example, each side member may include 1, 2, 3, 4, or more beads to enhance the longitudinal rigidity of the seat back structure 24. In addition, the bottom cross member 36 of the web 26 includes a horizontal bead 48 configured to increase the lateral rigidity of the seat back structure 24. While the bottom cross member 36 includes a single bead in the illustrated embodiment, it should be appreciated that alternative embodiments may include more or fewer beads. For example, the bottom side member 36 may include 1, 2, 3, 4, or more beads. In addition, the top side member 34 may include one or more beads in alternative embodiments. The illustrated embodiment also includes a substantially vertical bead 50 along the interface between the left side member 30 and the outer flange 40, and along the interface between the right side member 32 and the outer flange 40. As will be appreciated, the length, width and shape of each bead may be particularly configured to establish the desired structural rigidity of the seat back structure 24.

As illustrated, the inner flange 38 extending from the top cross member 34 of the web 26 includes two openings 52 configured to receive headrest guides 54. Each headrest guide 54 is configured to support a headrest rod of a headrest assembly. As discussed in detail below, a bracket may be coupled to the web 26, and configured to support the headrest guides 54. In such a configuration, the top cross member 34 includes openings 56 configured to facilitate access to the headrest guides 54, thereby enabling an operator or an automated system to couple the headrest guides 54 to the bracket (e.g., via a welded connection). While two headrest guides 54 are included in the illustrated embodiment, it should be appreciated that more or fewer headrest guides (e.g., 1, 2, 3, 4, or more) may be employed in alternative embodiments.

In the illustrated embodiment, the seat back structure 24 is formed from a single piece of material. Specifically, each feature of the seat back structure 24 (e.g., the web 26, the inner flange 38, the outer flange 40, the beads 46, 48 and 50, etc.) is formed by a single forming operation or series of forming operations. In this manner, manufacturing costs associated with structure construction may be substantially reduced compared to configurations that employ multiple components secured together to form a complete seat back structure. In addition, because fasteners and/or welded joints used to secure components together are obviated, the illustrated one-piece seat back structure may be substantially lighter than multi-component structures.

Figure 4:
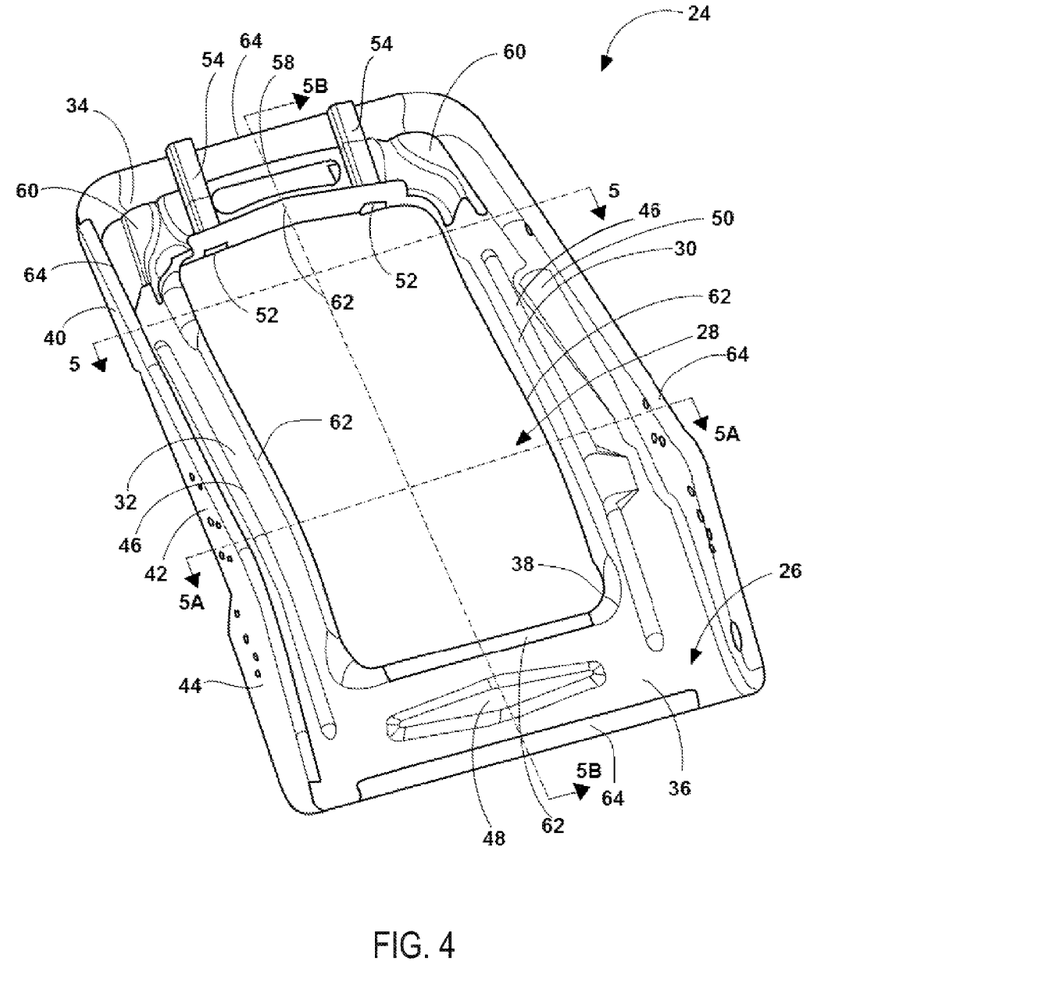
FIG. 4 is a front perspective view of the seat back structure of FIG. 3.

FIG. 4 is a front perspective view of the seat back structure 24 of FIG. 3. In the illustrated embodiment, a bracket 58 is coupled to the top cross member 34 of the web 26 (e.g., via a welded connection, fasteners, etc.), and configured to support the headrest guides 54. In certain embodiments, an operator or automated system may weld the headrest guides 54 to the bracket 58 through the openings 56 in the front of the top cross member 34, thereby securing the guides 54 to the seat back structure 24. In alternative embodiments, the bracket 58 may be omitted, and the headrest guides 54 may be welded, or otherwise coupled, to the inner and outer flanges 38 and 40 of the top cross member 34. In further embodiments, passages configured to support the headrest rods may be extruded within the top cross member 34, thereby obviating the bracket 58 and the headrest guides 54.

The illustrated embodiment also includes stiffening elements 60 positioned on opposite lateral sides of the bracket 58. The stiffening elements 60 are configured to enhance the structural rigidity of the seat back structure 24 in areas likely to experience greater loads. As will be appreciated, the stiffening elements 60 may be coupled to the web 26 and/or the bracket 58 by a welded connection, fasteners, or an adhesive connection, for example. Alternatively, the stiffening elements 60 and the bracket 58 may be formed from a single piece of material. In certain embodiments, the bracket 58 and/or the stiffening elements 60 may be formed from material removed from the seat back structure 24 during the forming process. For example, the seat back structure 24 may be formed from a continuous sheet of material (e.g., steel, aluminum, etc.). In such an embodiment, material may be removed from the center of the sheet to form the central opening 28. The material removed from the sheet may then be formed into the bracket 58, the stiffening elements 60 and/or other components (e.g., headrest guides 54, recliner mechanism supports, etc.) of the seating assembly. As a result, the material costs associated with the vehicle seat may be substantially reduced compared to configurations in which ancillary components are formed from additional material.

In the illustrated embodiment, the inner flange 38 includes a lip 62 extending about a portion of the flange 38. Specifically, the lip 62 is formed adjacent to the left side member 30, the right side member 32, the top cross member 34 and the bottom cross member 36. The lip 62 provides added structural rigidity to the seat back structure 24 without significantly increasing the weight. In addition, the outer flange 40 includes a lip 64 extending about a portion of the flange 40 adjacent to the left side member 30, the right side member 32, the top cross member 34 and the bottom cross member 36. Similar to the inner lip 62, the outer lip 64 increases the rigidity of the seat back structure 24, thereby enabling the structure to resist loads associated with vehicular impacts (e.g., rapid accelerations or decelerations).

In certain embodiments, the seat back structure 24 may be formed from a tailor welded blank. A tailor welded blank includes multiple layers of steel and/or other materials (e.g., aluminum, etc.) welded together to form a blank having desired structural properties. For example, certain regions of the blank may have increased thickness (e.g., via welding additional layers of material to the blank) to enhance structural rigidity. Other regions of the blank may include material having greater ductility and/or malleability to facilitate formation of complex shapes. As a result, once the tailor welded blank is formed (e.g., via a stamping process) into the desired shape, the resultant structure (e.g., seat back structure 24) may include complex geometric shapes, while providing the desired strength and structural rigidity.

Figure 5:
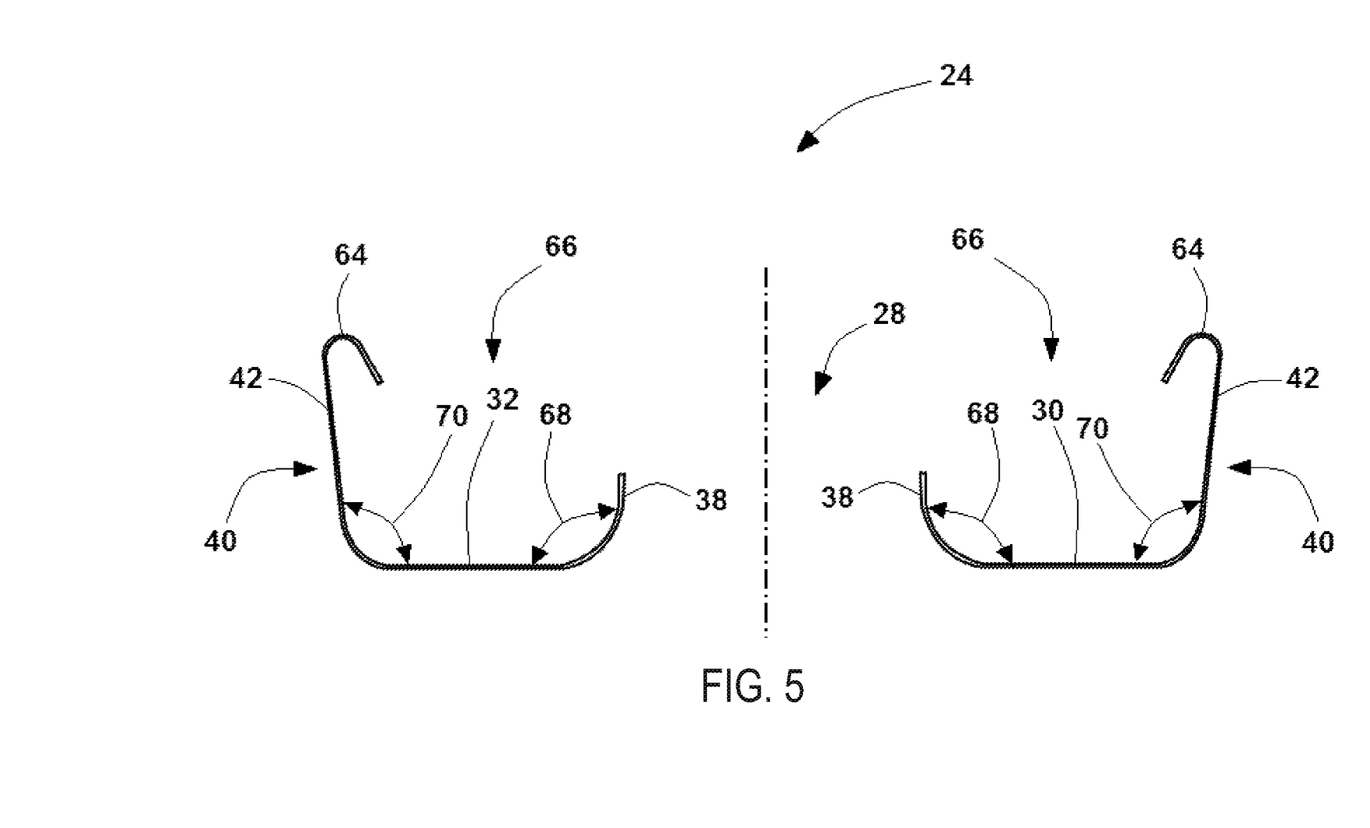
FIG. 5 is a cross-sectional view of the seat back structure of FIG. 4, taken along line 5-5.

FIG. 5 is a cross-sectional view of the seat back structure of FIG. 4, taken along line 5-5. As illustrated, the inner flange 38, the outer flange 40 and the web 32 form a channel 66 extending about the seat back structure 24. As previously discussed, the channel 66 enhances the structural rigidity of the seat back structure 24, thereby providing a lighter and/or stronger structure compared to structures having an inner flange or an outer flange that only extends about a portion of the web. In the illustrated embodiment, the inner flange 38 is oriented laterally inward from the web 26 at an angle 68. While the angle 68 is approximately 90 degrees in the illustrated embodiment, it should be appreciated that a larger or smaller angle may be employed in alternative embodiments. In addition, the first region 42 of the outer flange 40 is oriented more than 90 degrees laterally outward from the web 26 at an angle 70, thereby providing a more rigid structure than a perpendicular outer flange. As will be appreciated, the angles 68 and 70 may be particularly selected to provide the desired rigidity and/or strength. Similarly, the width of the web 26, the length of the inner flange 38 and/or the length of the outer flange 40 may be selected to provide the seat back structure 24 with the desired structural properties.

Figure 5A:
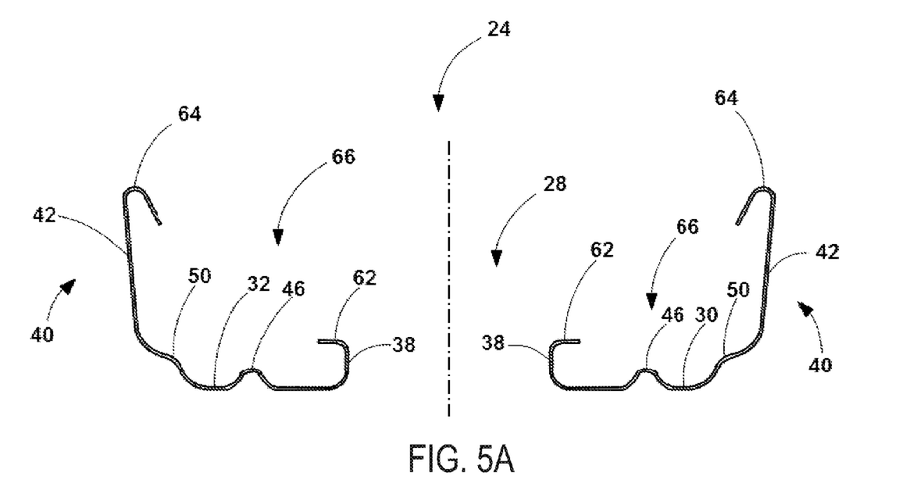
FIG. 5A is a cross-sectional view of the seat back structure of FIG. 4, taken along line 5A-5A.

FIG. 5A is a cross-sectional view of the seat back structure of FIG. 4, taken along line 5A-5A. As illustrated, the shape of the channel 66 is substantially similar to the shape of the channel 66 shown in FIG. 5, thereby establishing a consistent channel profile which enhances the structural rigidity of the seat back structure 24. In addition, the illustrated cross-section shows the profile of the beads 46 and 50 that further enhance the rigidity of the structure 24 without substantially increasing weight. The illustrated cross-section also shows the lip 62 formed along the inner flange 38 and the lip 64 formed along the outer flange 40. As previously discussed, the lips 62 and 64 serve to increase the rigidity of the seat back structure 24 along a direction perpendicular to the lips. The lips 62 and 64 also serve to facilitate handling the seat back structure 24 during installation, and to support a cushion mounted within the channel 66.

Figure 5B:
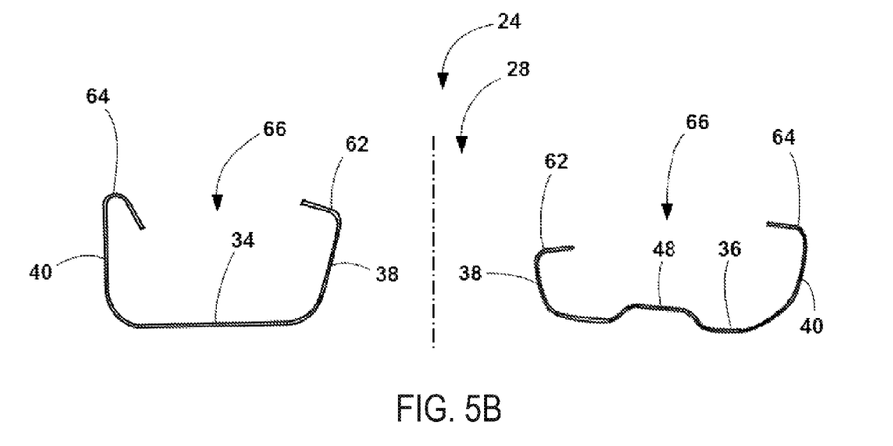
FIG. 5B is a cross-sectional view of the seat back structure of FIG. 4, taken along line 5B-5B.

FIG. 5B is a cross-sectional view of the seat back structure of FIG. 4, taken along line 5B-5B. As illustrated, the shape of the channel 66 is substantially similar to the shape of the channel 66 shown in FIGS. 5 and 5A, thereby further demonstrating the consistent channel profile that enhances the structural rigidity of the seat back structure 24. In addition, the flanges 38 and 40 may serve to support various ancillary structures, such as the headrest guides 54 discussed above with reference to FIG. 4. Furthermore, the lips 62 and 64 serve to enhance the rigidity of the seat back structure 24, to facilitate handling the structure 24 during installation, and to support a cushion mounted within the channel 66.

Figure 6:
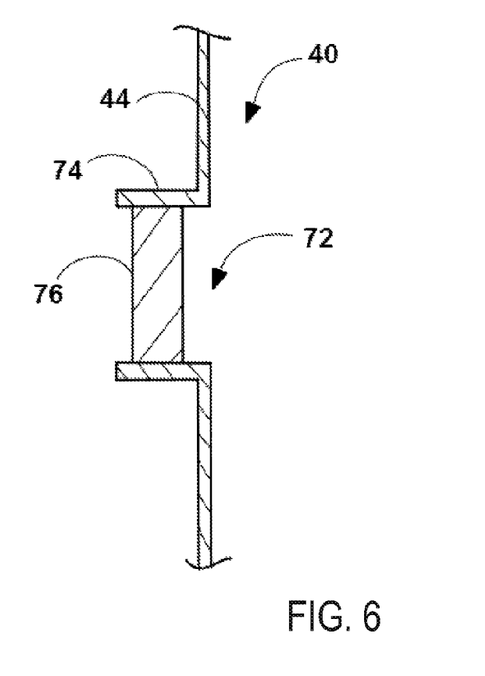
FIG. 6 is a cross-sectional view of an embodiment of a recliner mechanism mounting feature.

FIG. 6 is a cross-sectional view of an embodiment of a recliner mechanism mounting feature. As illustrated, the second region 44 of the outer flange 40 (either extending from the left side member 30 or the right side member 32 of the web 26) includes an opening 72 and a mating surface 74 extending about the circumference of the opening 72. In the illustrated embodiment, the opening 72 is configured to receive a recliner mechanism 76 such that the mating surface 74 contacts an outer circumferential surface of the recliner mechanism. As discussed in detail below, the mating surface 74 is compressible in a radially inward direction to capture the recliner mechanism 76. Because the opening 72 and the mating surface 74 are formed from the same piece of material as the other features of the seat back structure 24, the illustrated recliner mounting feature may be formed without the addition of any supporting structural elements. Consequently, the one-piece seat back structure 24 may be lighter and less expensive to produce than configurations which employ separate mounting features for the recliner mechanism.

Figure 7:
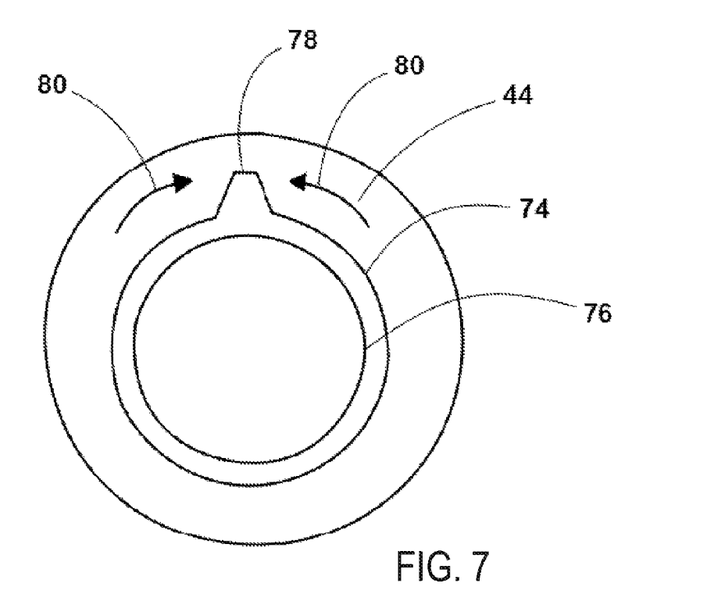
FIG. 7 is a front view of the recliner mechanism mounting feature of FIG. 6.

FIG. 7 is a front view of the recliner mechanism mounting feature of FIG. 6. As illustrated, the mating surface 74 includes an extension 78 configured to drive the mating surface radially inward as the extension 78 is compressed. Specifically, applying a circumferentially inward force to the extension 78 in the direction 80 drives the mating surface 74 radially inward, thereby capturing the recliner mechanism 76. In certain embodiments, the mechanical force applied to the recliner mechanism 76 may be sufficient to secure the mechanism to the seat back structure 24. Alternatively, the recliner mechanism 76 may be welded, or otherwise secured, to the outer flange 40 after the mating surface 74 has been compressed.

Figure 8:
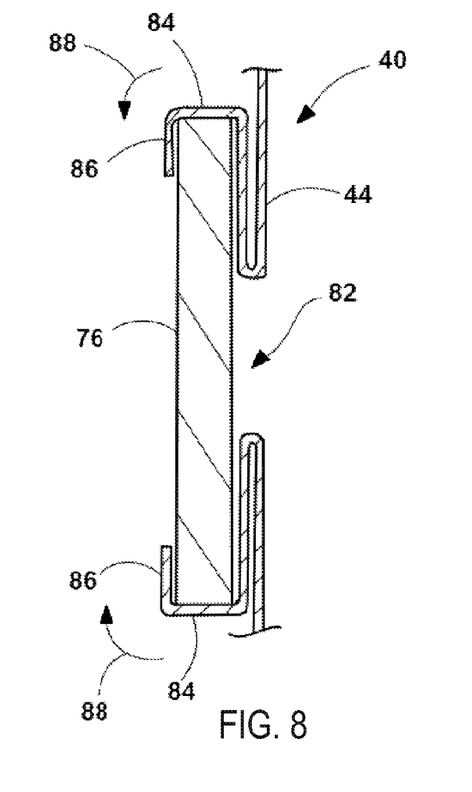
FIG. 8 is a cross-sectional view of an alternative embodiment of a recliner mechanism mounting feature.

FIG. 8 is a cross-sectional view of an alternative embodiment of a recliner mechanism mounting feature. As illustrated, the second region 44 of the outer flange 40 (either extending from the left side member 30 or the right side member 32 of the web 26) includes a cavity 82 having a lip 84 extending about a circumference of the cavity 82. In the illustrated embodiment, the cavity 82 is configured to receive the recliner mechanism 76, and the lip 84 is configured to bend in a radially inward direction to capture the mechanism 76. Specifically, to capture the recliner mechanism 76, the mechanism 76 is inserted within the cavity 82, and then a distal end 86 of the lip 84 is bent inwardly in the radial direction 88. As a result, contact between the recliner mechanism 76 and the lip 84 blocks radial and axial movement of the mechanism 76 with respect to the seat back structure 24. In addition, the recliner mechanism 76 may be welded, or otherwise secured, to the outer flange 40 after the distal end 86 of the lip 84 is bent radially inward to further secure the recliner mechanism 76 to the seat back structure 24. In the illustrated embodiment, the lip 84 is formed from the same piece of material as the other features of the seat back structure 24. However, alternative embodiments may include a similar mounting feature welded, or otherwise secured, to the second region 44 of the outer flange 40.

In further embodiments, the lip 84 may include an additional portion configured to support an annular spring or other component of the recliner mechanism. For example, the distal end 86 of the lip 84 may include an axial extension configured to contact an inner surface of the annular spring, thereby positioning the spring adjacent to the recliner mechanism 76. Similar to the recliner mechanism 76, the annular spring may be welded, or otherwise secured, to the second region 44 of the outer flange 40. Once the annular spring is coupled to the recliner mechanism 76, the spring will serve to bias the seat back toward a lowered position.

Figure 9:
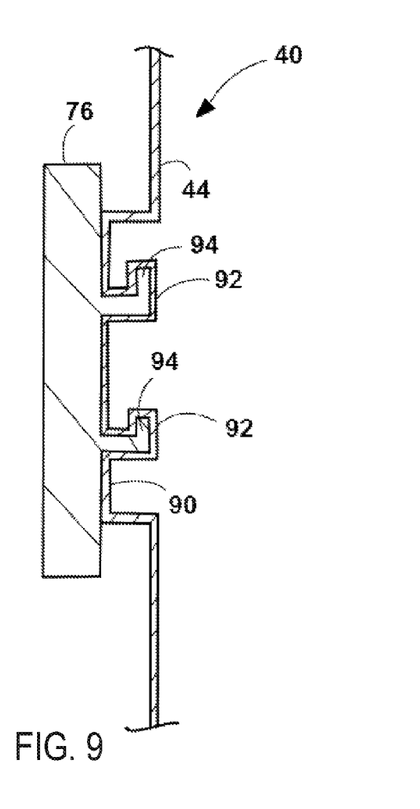
FIG. 9 is a cross-sectional view of another embodiment of a recliner mechanism mounting feature.

FIG. 9 is a cross-sectional view of another embodiment of a recliner mechanism mounting feature. As illustrated, the second region 44 of the outer flange 40 includes a mechanical locking feature configured to secure the recliner mechanism 76 to the outer flange 40. In the illustrated embodiment, the outer flange 40 includes a raised region 90 having two keyhole locks 92 configured to interface with two corresponding protrusions 94 of the recliner mechanism 76. In this configuration, the recliner mechanism 76 is secured to the seat back structure 24 by first inserting the protrusions 94 into openings in the outer flange 40 sufficiently large to receive the protrusions 94. The recliner mechanism 76 is then rotated in a circumferential direction until the protrusions 94 engage the keyhole locks 92. Once engaged, contact between the protrusions 94 and the locks 92 will secure the recliner mechanism 76 to the outer flange 40. Because the keyhole locks 92 are formed from the same piece of material as the other features of the seat back structure 24, the illustrated recliner mounting feature may be formed without the addition of any supporting structural elements. Consequently, the one-piece seat back structure 24 may be lighter and less expensive to produce than configurations which employ separate mounting features for the recliner mechanism.

While the illustrated protrusions 94 are substantially L-shaped, it should be appreciated that other shapes (e.g., multi-angled protrusions) may be employed in alternative embodiments. Furthermore, while two protrusions 94 and keyhole locks 92 are employed in the illustrated embodiment, it should be appreciated that alternative embodiments may include more or fewer protrusions 94 and locks 92. For example, certain embodiments may include 1, 2, 3, 4, or more protrusions 94 and a corresponding number of keyhole locks 92. In addition, it should be appreciated that the recliner mechanism 76 may be welded, or otherwise secured, to the outer flange 40 after the protrusions 94 are engaged with the keyhole locks 92 to further secure the recliner mechanism 76 to the seat back structure 24.

Figure 10:
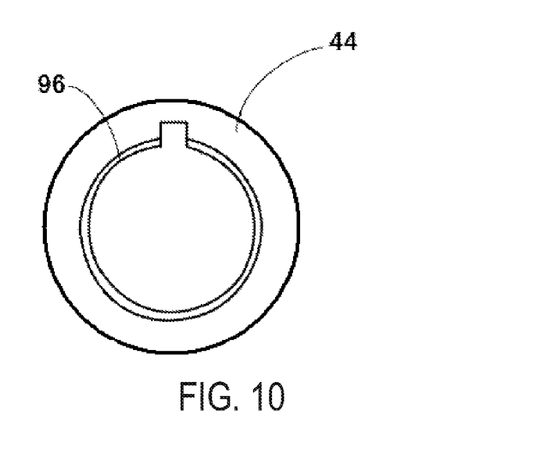
FIG. 10 is a front view of a further embodiment of a recliner mechanism mounting feature.

FIG. 10 is a front view of a further embodiment of a recliner mechanism mounting feature. Similar to the embodiment described above with reference to FIG. 9, the second region 44 of the outer flange 40 includes a mechanical locking feature configured to secure the recliner mechanism to the outer flange 40. In the illustrated embodiment, a locking nut 96 is formed (e.g., via a stamping process) within the second region 44 of the outer flange 40. The locking nut 96 is configured to engage a protrusion extending from the recliner mechanism, thereby securing the recliner mechanism to the seat back structure 24. In certain embodiments, the mechanical force applied to the recliner mechanism 76 may be sufficient to secure the mechanism to the seat back structure 24. Alternatively, the recliner mechanism 76 may be welded, or otherwise secured, to the outer flange 40 after the protrusion has engaged the locking nut 96. Because the locking nut 96 is formed from the same piece of material as the other features of the seat back structure 24, the illustrated recliner mounting feature may be formed without the addition of any supporting structural elements. Consequently, the one-piece seat back structure 24 may be lighter and less expensive to produce than configurations which employ separate mounting features for the recliner mechanism.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A seat back structure, comprising:
a web extending about a central opening, wherein the web includes a left side member having a first substantially flat portion and a right side member having a second substantially flat portion;
an inner flange extending about an inner perimeter of the web adjacent to the central opening, wherein the inner flange extends along the left side member and the right side member; and
an outer flange extending about an outer perimeter of the web, wherein the outer flange extends along the left side member and the right side member, the inner flange, the outer flange and the web form a channel extending about the seat back structure, the seat back structure is formed from a single continuous sheet of material, and the outer flange of each side member includes a first portion orientated more than 90 degrees laterally outward from a respective substantially flat portion of the web.

2. The seat back structure of claim 1, wherein the outer flange of each side member includes a second portion oriented approximately perpendicular to the web to facilitate mounting a recliner mechanism to the seat back structure.

3. The seat back structure of claim 2, wherein the second portion comprises an opening and a mating surface extending about a circumference of the opening, the opening is configured to receive the recliner mechanism, and the mating surface is compressible in a radially inward direction to capture the recliner mechanism.

4. The seat back structure of claim 2, wherein the second portion comprises a cavity having a lip extending about a circumference of the cavity, the cavity is configured to receive the recliner mechanism, and the lip is configured to bend in a radially inward direction to capture the recliner mechanism.

5. The seat back structure of claim 2, wherein the second portion comprises a mechanical locking feature configured to secure the recliner mechanism to the outer flange.

6. The seat back structure of claim 1, comprising a first lip extending along at least a portion of the inner flange, a second lip extending along at least a portion of the outer flange, or a combination thereof.

7. The seat back structure of claim 1, comprising a substantially vertical bead in the web, a substantially horizontal bead in the web, a substantially vertical bead along an interface between the web and the outer flange, or a combination thereof, wherein each bead is configured to stiffen the seat back structure.

8. The seat back structure of claim 1, comprising a headrest guide configured to support a headrest rod, wherein the inner flange, the outer flange, or a combination thereof, includes an opening configured to receive the headrest guide.

9. The seat back structure of claim 8, comprising a bracket coupled to the web and configured to support the headrest guide.

10. A seat back structure, comprising:
a web having a left side member, a right side member, a top cross member, and a bottom cross member, wherein the left side member includes a first substantially flat portion, and the right side member includes a second substantially flat portion;
an inner flange extending along an inner side of the left side member, the right side member, the top cross member and the bottom cross member; and
an outer flange extending along an outer side of the left side member, the right side member, the top cross member and the bottom cross member, wherein the inner flange, the outer flange and the web form a channel extending about the seat back structure, the seat back structure is formed from a single continuous sheet of material, and the outer flange of each side member includes a first region orientated more than 90 degrees laterally outward from a respective substantially flat portion of the web.

11. The seat back structure of claim 10, wherein the outer flange of the left side member or the right side member includes a second region oriented approximately perpendicular to the web to facilitate mounting a recliner mechanism to the seat back structure.

12. The seat back structure of claim 10, comprising a substantially vertical bead in the left side member of the web, a substantially vertical bead in the right side member of the web, a substantially horizontal bead in the bottom cross member of the web, a substantially vertical bead along an interface between the left side member of the web and the outer flange, a substantially vertical bead along an interface between the right side member of the web and the outer flange, or a combination thereof, wherein each bead is configured to stiffen the seat back structure.

13. The seat back structure of claim 10, comprising a headrest guide configured to support a headrest rod, wherein the inner flange of the top cross member, the outer flange of the top cross member, or a combination thereof, includes an opening configured to receive the headrest guide.

14. The seat back structure of claim 10, comprising a first lip extending along the inner flange of the left side member, the right side member, the top cross member and the bottom cross member, a second lip extending along the outer flange of the left side member, the right side member, the top cross member and the bottom cross member, or a combination thereof.

15. A method of manufacturing a seat back structure, comprising:
forming the seat back structure from a single continuous sheet of material, wherein the seat back structure comprises a web extending about a central opening, an inner flange extending about an inner perimeter of the web adjacent to the central opening, and an outer flange extending about an outer perimeter of the web;
wherein the web includes a left side member having a first substantially flat portion and a right side member having a second substantially flat portion, the inner flange extends along the left side member and the right side member, the outer flange extends along the left side member and the right side member, the inner flange, the outer flange, and the web form a channel extending about the seat back structure, and the outer flange of each side member includes a first portion orientated more than 90 degrees laterally outward from a respective substantially flat portion of the web.

16. The method of claim 15, wherein forming the seat back structure comprises removing a portion of the continuous sheet of material to form the central opening, shaping the portion of the continuous sheet of material to form stiffening elements, and coupling the stiffening elements to the seat back structure.

17. The method of claim 15, wherein forming the seat back structure comprises forming a lip along at least a portion of the inner flange, forming a lip along at least a portion of the outer flange, or a combination thereof.

18. The method of claim 15, wherein forming the seat back structure comprises orienting a second portion of the outer flange of each side member approximately perpendicular to the web to facilitate mounting a recliner mechanism to the seat back structure.

19. The method of claim 15, wherein forming the seat back structure comprises forming a substantially vertical bead in the web, forming a substantially horizontal bead in the web, forming a substantially vertical bead along an interface between the web and the outer flange, or a combination thereof, wherein each bead is configured to stiffen the seat back structure.

* * * * *